United States Patent
Sano et al.

(10) Patent No.: US 8,857,288 B2
(45) Date of Patent: Oct. 14, 2014

(54) CONNECTION STRUCTURE OF CONTROL CABLE

(71) Applicant: HI-LEX Corporation, Hyogo (JP)

(72) Inventors: Ritsu Sano, Takarazuka (JP); Takahiro Horinaka, Takarazuka (JP)

(73) Assignee: HI-LEX Corporation, Hyogo (JP)

( * ) Notice: Subject to any disclaimer, the term of this patent is extended or adjusted under 35 U.S.C. 154(b) by 0 days.

(21) Appl. No.: 13/656,074

(22) Filed: Oct. 19, 2012

(65) Prior Publication Data

US 2013/0247709 A1 Sep. 26, 2013

(30) Foreign Application Priority Data

Oct. 21, 2011 (JP) ................................. 2011-231657

(51) Int. Cl.
*F16C 1/10* (2006.01)

(52) U.S. Cl.
CPC ............. *F16C 1/101* (2013.01); *F16C 2326/08* (2013.01); *F16C 1/106* (2013.01)
USPC ...................................................... 74/502.4

(58) Field of Classification Search
USPC ................. 74/500.5, 502.4, 502.6; 297/463.1, 297/463.2; 188/65.5
See application file for complete search history.

(56) References Cited

U.S. PATENT DOCUMENTS

| | | | | |
|---|---|---|---|---|
| 4,811,620 A | * | 3/1989 | Old et al. | 74/471 R |
| 5,138,898 A | * | 8/1992 | Pospisil et al. | 74/502.6 |
| 6,085,611 A | * | 7/2000 | Valdez | 74/501.6 |
| 6,511,248 B2 | * | 1/2003 | Wu | 403/220 |
| 7,350,870 B2 | * | 4/2008 | Bates | 297/463.1 |

FOREIGN PATENT DOCUMENTS

| | | |
|---|---|---|
| JP | 08-277830 A | 10/1996 |
| JP | 2007-071262 A | 3/2007 |
| JP | 2008-101718 A | 5/2008 |

* cited by examiner

*Primary Examiner* — Vicky Johnson
(74) *Attorney, Agent, or Firm* — Studebaker & Brackett PC (57) ABSTRACT

A connection structure of a control cable includes one control cable, the other control cable, a joint case separable into pieces on respective sides of one and the other control cables, a joint member, and an attachment member. The other control cable includes first and second control cables. The attachment member has a fitting portion allowing fitting of an inner cable of each of the first and second control cables into an outer circumferential surface of the attachment member. The fitting portion can be exposed from an internal space when the joint case is separated. Thus, a connection structure of a control cable with which an inner cable can readily be removed can be obtained.

6 Claims, 5 Drawing Sheets

FIG.7

CONNECTION STRUCTURE OF CONTROL CABLE

This nonprovisional application is based on Japanese Patent Application No. 2011-231657 filed with the Japan Patent Office on Oct. 21, 2011, the entire contents of which are hereby incorporated by reference.

BACKGROUND OF THE INVENTION

1. Field of the Invention

The present invention relates to a connection structure of a control cable, and particularly to a connection structure of a control cable for connecting control cables on a drive side and a driven side.

2. Description of the Background Art

Conventionally, there is a case where removal of an inner cable of a control cable is desired due to failure or the like. For example, Japanese Patent Laying-Open No. 2008-101718 proposes a relay in which an inner cable can be replaced. In the relay described in this publication, a casing includes a lid piece, with which a part of a circumferential wall is attachable and removable from a portion around a center to a front end. The relay is constructed such that the lid piece can be taken out and a joint piece can be taken out of the inside of the casing.

In the relay described in the publication above, however, the removed lid piece is a part of the circumferential wall of the casing, and hence an area where the lid piece has been removed is small. Therefore, an operation for removing the inner cable is difficult.

SUMMARY OF THE INVENTION

The present invention was made in view of the problem above, and an object thereof is to provide a connection structure of a control cable with which an inner cable can readily be removed.

A connection structure of a control cable according to the present invention includes one control cable connected to a drive side, the other control cable connected to a driven side, a joint case, a joint member and an attachment member. The joint case has an internal space in which an end portion of an inner cable of each of one and the other control cables can be arranged and can be separated into pieces on respective sides of one and the other control cables. The joint member is connected to the end portion of the inner cable of one control cable and is movable along an inner wall of the internal space. The attachment member is connected to the end portion of the inner cable of the other control cable, can be connected to the joint member in the internal space, and is movable along the inner wall of the internal space in a connected state. The other control cable includes first and second control cables. The attachment member has a fitting portion allowing fitting of the inner cable of each of the first and second control cables into an outer circumferential surface of the attachment member. The fitting portion can be exposed from the internal space when the joint case is separated.

In the connection structure of a control cable according to the present invention, the attachment member has the fitting portion allowing fitting of the inner cable of each of the first and second control cables into the outer circumferential surface of the attachment member. Then, the fitting portion can be exposed from the internal space when the joint case is separated. Therefore, the inner cable of each of the first and second control cables can be held in the fitting portion or removed from the fitting portion while the fitting portion is exposed from the internal space. Thus, the inner cable of each of the first and second control cables can readily be removed.

In addition, since the first and second control cables can be removed from the fitting portion in the outer circumferential surface of the attachment member, each inner cable can readily be removed even in the case where there are a plurality of the other control cables.

Moreover, since the respective inner cables of the first and second control cables can be fitted to the fitting portion, even when any one inner cable is broken, the broken inner cable alone can readily be removed. Thus, the broken inner cable can readily be replaced.

In the connection structure of a control cable above, preferably, a direction of fitting of the inner cable of each of the first and second control cables to the attachment member is a direction crossing a direction of movement of the attachment member in the joint case. Therefore, the inner cable of each of the first and second control cables is locked in the fitting portion in the direction crossing the direction of movement of the attachment member in the joint case. Thus, even though the attachment member moves in the joint case, such a state that the inner cable of each of the first and second control cables is fitted to the attachment member can be held.

In the connection structure of a control cable above, preferably, the attachment member includes an end portion accommodation portion for receiving the end portion of the inner cable of the other control cable, which is provided to open to a side surface on a side of one control cable relative to an end surface on a side of the other control cable, an inner cable accommodation portion for accommodating the inner cable of the other control cable provided on the side of the other control cable relative to the end portion accommodation portion, and a detachment prevention member for preventing detachment of the inner cable of the other control cable from the attachment member after the inner cable of the other control cable is placed in the attachment member.

Thus, since the end portion of the inner cable of the other control cable is received in the end portion accommodation portion, the inner cable of the other control cable can readily be removed through the opening in the side surface of the attachment member. In addition, the detachment prevention member can also prevent detachment of the inner cable of the other control cable from the attachment member after the inner cable of the other control cable is placed in the attachment member.

In the connection structure of a control cable above, preferably, the detachment prevention member includes a locking surface provided in the inner cable accommodation portion, for restricting movement of the inner cable of the other control cable in a direction of opening of the end portion accommodation portion while the end portion of the inner cable of the other control cable is accommodated in the end portion accommodation portion. Thus, the locking surface can restrict movement of the inner cable of the other control cable in the direction of opening of the end portion accommodation portion. Thus, detachment of the inner cable of the other control cable in the direction of opening can be prevented.

As described above, according to the present invention, the inner cable can readily be removed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention will be described hereinafter with reference to the drawings.

A construction of a connection structure of a control cable in one embodiment of the present invention will initially be described. In one embodiment of the present invention, a case where the connection structure of the control cable is applied to a seat for vehicle will be described by way of example of application of the present invention.

Figure 1:
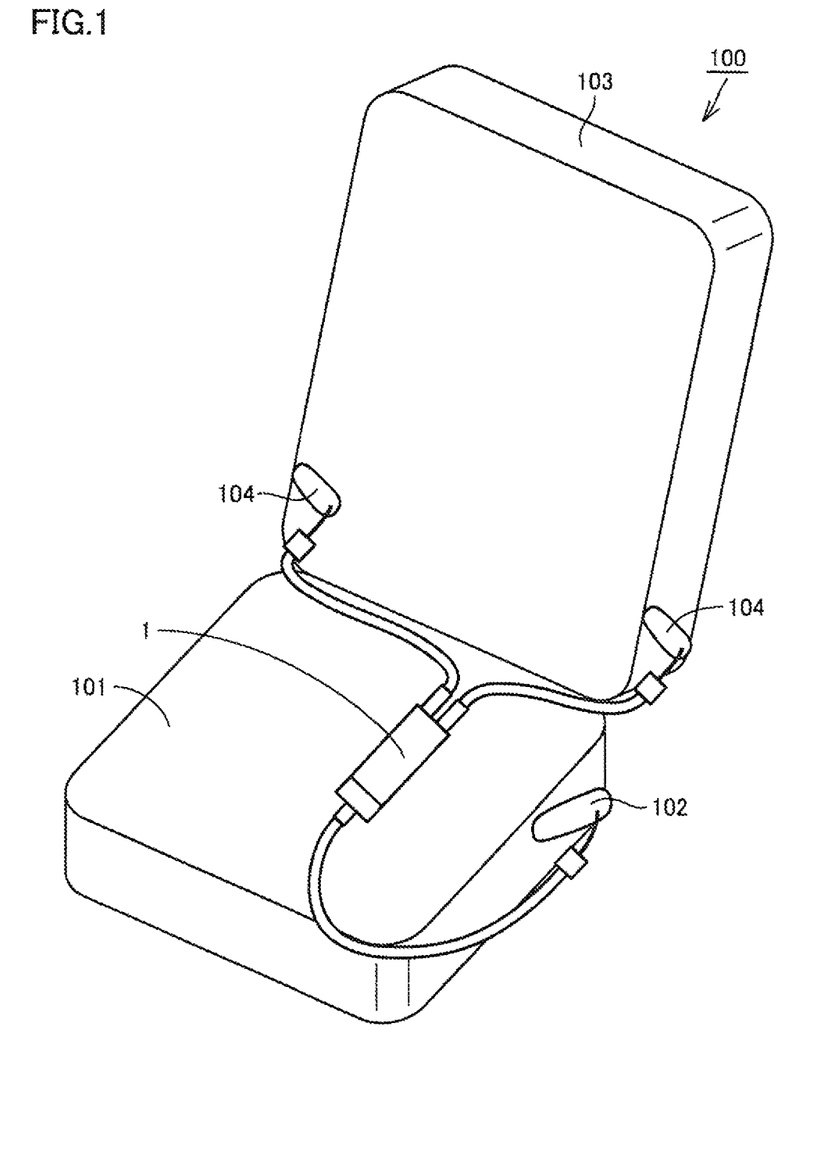
FIG. 1 is a schematic diagram of a connection structure of a control cable and a seat for vehicle in one embodiment of the present invention.

Referring to FIG. 1, a connection structure 1 of a control cable in one embodiment of the present invention is attached to a seat for vehicle 100. Seat for vehicle 100 mainly has a seat cushion 101, an operation lever 102, a seat back 103, and a reclining reset lever 104. Connection structure 1 of the control cable is arranged under seat cushion 101. It is noted that, in FIG. 1, connection structure 1 of the control cable is shown with a solid line for the sake of convenience of illustration.

Connection structure 1 of the control cable is connected to operation lever 102 and reclining reset lever 104. Seat back 103 is constructed such that it can be reclined. As operation lever 102 is operated, reclining reset lever 104 is operated through connection structure 1 of the control cable. Thus, a reclined state of seat back 103 is reset.

Figure 2:
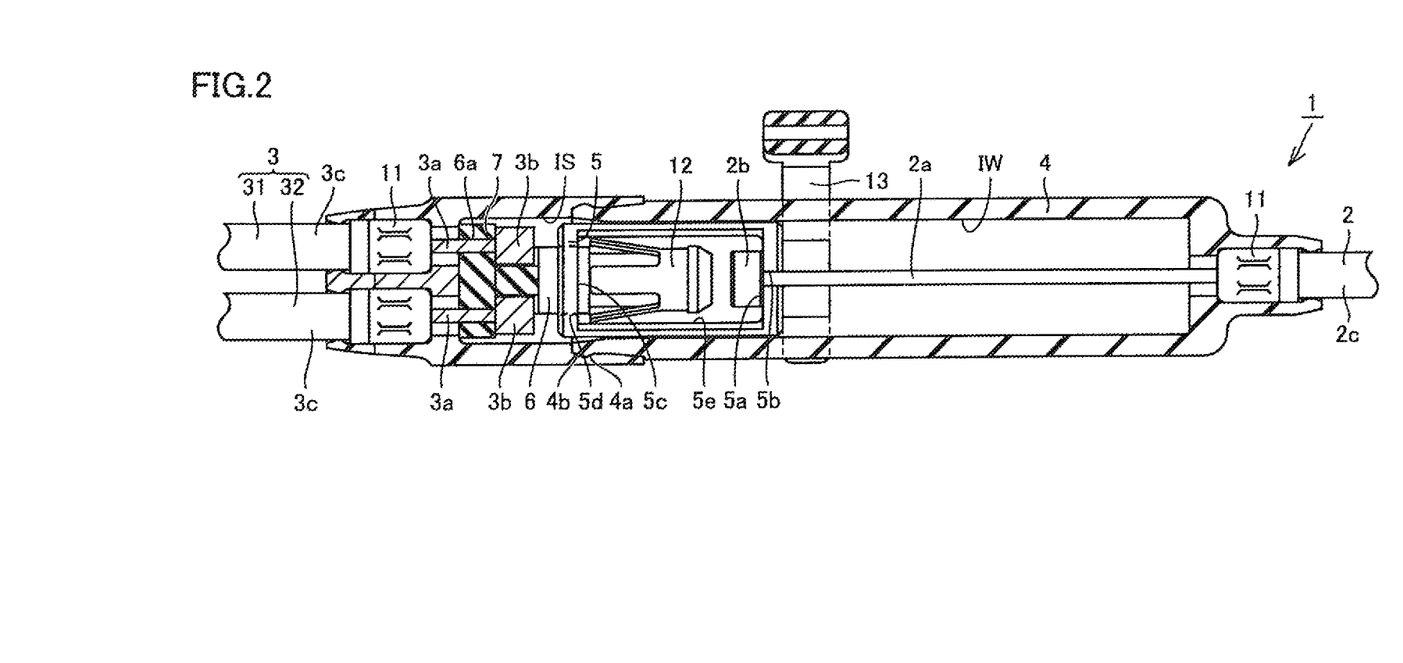
FIG. 2 is a schematic partial cross-sectional view of the connection structure of the control cable in one embodiment of the present invention.

In succession, a construction of connection structure 1 of the control cable will be described further in detail with reference to FIGS. 1 and 2.

Connection structure 1 of the control cable mainly has one control cable 2, the other control cable 3, a joint case 4, a joint member 5, an attachment member 6, a spring member 12, and a locking member 13. It is noted that, in FIG. 2, joint case 4, a part of attachment member 6, and locking member 13 are shown in cross-section for the sake of convenience of illustration.

One control cable 2 is provided to be connected to a drive side. In one embodiment of the present invention, one control cable 2 is connected to operation lever 102 representing the drive side. One control cable 2 has an inner cable 2a, an outer casing 2c, and a casing cap 11. Inner cable 2a has an end portion 2b at each of opposing ends. End portion 2b has, for example, a columnar shape. End portion 2b is fixed to a tip end of inner cable 2a by caulking or the like. End portion 2b is constructed to be movable while it projects from outer casing 2c.

End portion 2b at one end of inner cable 2a is connected to operation lever 102 representing the drive side, and end portion 2b at the other end is connected to joint member 5. Inner cable 2a is movably accommodated in outer casing 2c. Casing cap 11 is arranged at each of opposing end portions of outer casing 2c.

The other control cable 3 is provided to be connected to a driven side. In one embodiment of the present invention, the other control cable 3 is connected to reclining reset lever 104 representing the driven side. The other control cable 3 has a first control cable 31 and a second control cable 32. First control cable 31 and second control cable 32 are each connected to reclining reset lever 104.

First control cable 31 and second control cable 32 each have an inner cable 3a, an outer casing 3c, and casing cap 11. Inner cable 3a has an end portion 3b at each of opposing ends. End portion 3b has, for example, a columnar shape. End portion 3b is fixed to a tip end of inner cable 3a by caulking or the like. End portion 3b is movably constructed while it projects from outer casing 3c.

End portion 3b at one end of inner cable 3a is connected to reclining reset lever 104 representing the driven side, and end portion 3b at the other end is connected to attachment member 6. Inner cable 3a is movably accommodated in outer casing 3c. Casing cap 11 is arranged at each of opposing end portions of outer casing 3c.

Joint case 4 has an internal space IS in which end portion 2b of inner cable 2a of one control cable 2 and end portion 3b of inner cable 3a of the other control cable 3 can be arranged. Joint case 4 is formed in a cylindrical shape. Joint case 4 is constructed to be separable to pieces on respective sides of one control cable 2 and the other control cable 3.

Joint case 4 has an opening portion on each of opposing sides. Locking member 13 is formed in a U-shape such that it is inserted in the opening portion on each of the opposing sides of joint case 4. A protrusion projecting into internal space IS of joint case 4 is formed at a tip end of locking member 13. The protrusion restricts movement of joint member 5 in internal space IS in joint case 4.

Joint member 5 is coupled to end portion 2b of inner cable 2a of one control cable 2. Joint member 5 is constructed such that end portion 2b of inner cable 2a can be arranged in the inside on a one control cable 2 side. Joint member 5 has a groove 5b in which inner cable 2a can be locked, in an end surface 5a on the one control cable 2 side. Joint member 5 is constructed such that a tip end portion of attachment member 6 can be arranged in the inside on the other control cable 3 side. Joint member 5 has a hole 5d through which attachment member 6 can be inserted, in an end surface 5c on the other control cable 3 side.

Joint member 5 has an opening 5e provided to open between opposing end surfaces 5a, 5c in a longitudinal direction. Joint member 5 is constructed to be movable along an inner wall IW of internal space IS in joint case 4. Joint member 5 is constructed to be slidable in internal space IS with movement of inner cable 2a resulting from operation of one control cable 2.

Attachment member 6 is coupled to end portion 3b of inner cable 3a of the other control cable 3. Attachment member 6 can be connected to joint member 5 in internal space IS in joint case 4, and it is constructed to be movable along inner wall IW of internal space SI in a connected state.

Spring member 12 is attached to a portion of attachment member 6 on the one control cable 2 side. Spring member 12 is constructed so as to spread outward after spring member 12 is elastically deformed inward and inserted in the inside of joint member 5 through hole 5d. Therefore, spring member 12 can be locked to end surface 5c. Thus, disconnection from joint member 5, of attachment member 6 in which spring member 12 is placed, is suppressed.

Attachment member 6 has a fitting portion 7 allowing fitting of inner cable 3a of each of first control cable 31 and second control cable 32 into an outer circumferential surface 6a of attachment member 6. Fitting portion 7 is constructed such that it can be exposed from internal space IS when joint case 4 is separated.

Figure 3:
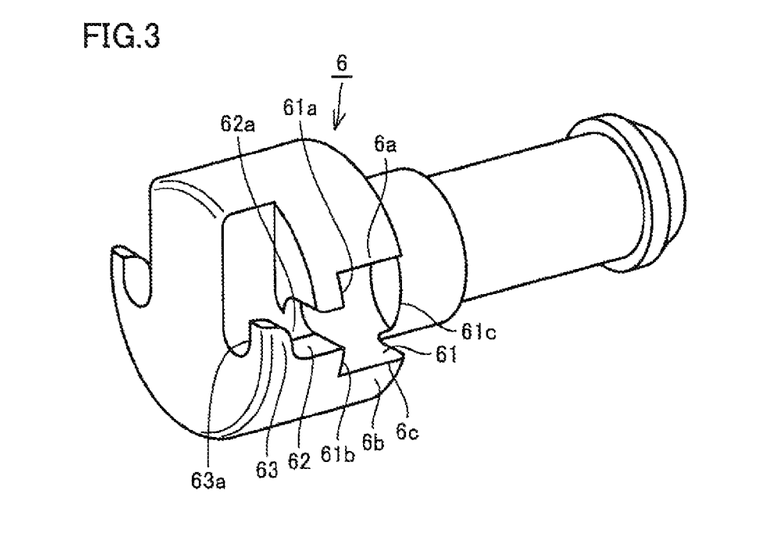
FIG. 3 is a schematic perspective view of an attachment member of the connection structure of the control cable in one embodiment of the present invention.

A construction of attachment member 6 will be described further in detail with reference to FIGS. 3 and 4.

Attachment member 6 has an end portion accommodation portion 61, an inner cable accommodation portion 62, and a detachment prevention member 63. End portion accommodation portion 61 is a portion for receiving end portion 3b of inner cable 3a of the other control cable 3. End portion accommodation portion 61 is provided to open to a side surface 6b on the one control cable 2 side relative to an end surface on the other control cable 3 side. End portion accommodation portion 61 is constructed to be able to receive end portion 3b through an opening 6c in side surface 6b. End portion accommodation portion 61 may be formed to conform to a shape of end portion 3b.

Inner cable accommodation portion 62 is a portion for accommodating inner cable 3a of the other control cable 3. Inner cable accommodation portion 62 is provided on the other control cable 3 side relative to end portion accommodation portion 61. Inner cable accommodation portion 62 is constructed to be able to lock inner cable 3a. Inner cable accommodation portion 62 may have a groove 62a in which inner cable 3a is accommodated. End portion accommodation portion 61, inner cable accommodation portion 62, and detachment prevention member 63 constitute fitting portion 7.

A direction of fitting of inner cable 3a of each of first control cable 31 and second control cable 32 to attachment member 6 is a direction YD crossing a direction of movement XD of attachment member 6 in joint case 4.

Detachment prevention member 63 is provided to prevent detachment of inner cable 3a of the other control cable 3 from attachment member 6 after placement of inner cable 3a of the other control cable 3 in attachment member 6.

Detachment prevention member 63 is provided in inner cable accommodation portion 62. Detachment prevention member 63 has a locking surface 63a restricting movement of inner cable 3a of the other control cable 3 in a direction of opening of end portion accommodation portion 61 while end portion 3b of inner cable 3a of the other control cable 3 is accommodated in end portion accommodation portion 61. Here, the direction of opening refers to a direction from a center of end portion accommodation portion 61 toward opening 6c in side surface 6b. Locking surface 63a is provided to face opening 6c in side surface 6b of end portion accommodation portion 61. Detachment prevention member 63 may be a protrusion provided to project from inner cable accommodation portion 62. Detachment prevention member 63 may be a recess provided as being recessed in inner cable accommodation portion 62.

Figure 4:
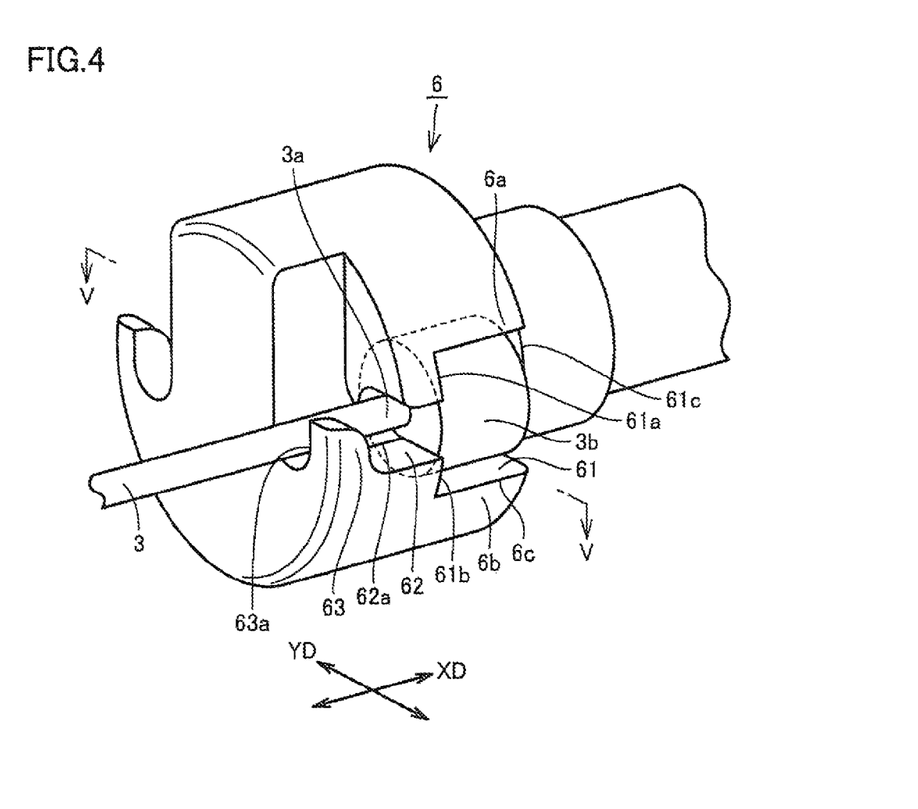
FIG. 4 is a schematic perspective view showing such a state that the attachment member of the connection structure of the control cable and an inner cable of the other control cable are fitted to each other in one embodiment of the present invention.
Figure 5:
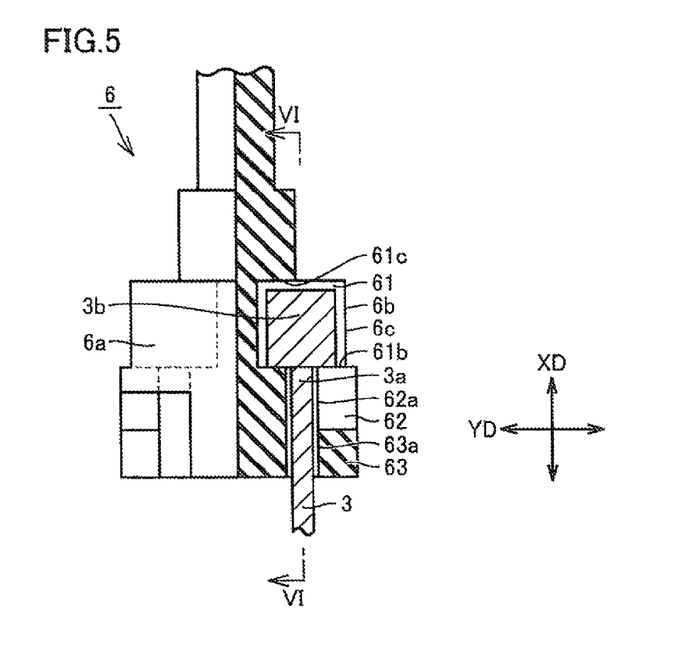
FIG. 5 is a schematic cross-sectional view along the line V-V in FIG. 4.
Figure 6:
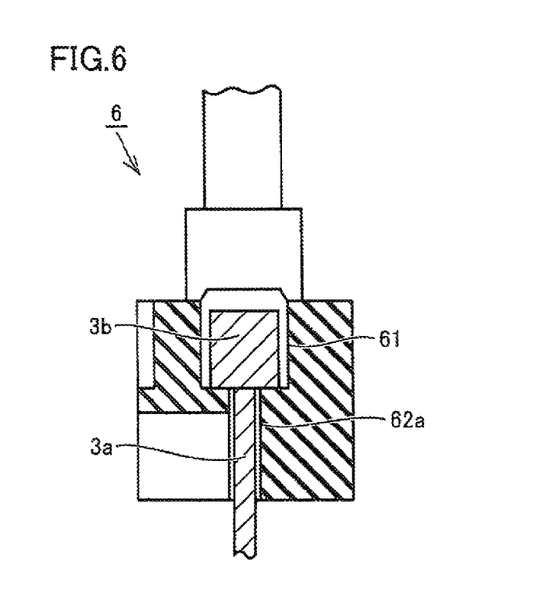
FIG. 6 is a schematic cross-sectional view along the line VI-VI in FIG. 5.

Referring to FIGS. 4 to 6, when end portion 3b of inner cable 3a of the other control cable 3 is moved by attachment member 6, end portion 3b can be locked by a first locking portion 61a, a second locking portion 61b, and a third locking portion 61c of end portion accommodation portion 61. Therefore, first locking portion 61a, second locking portion 61b, and third locking portion 61c prevent end portion 3b from coming off in direction of movement XD of attachment member 6 in joint case 4. In addition, detachment prevention member 63 prevents end portion 3b from coming off in direction YD crossing direction of movement XD of attachment member 6 in joint case 4.

An operation of the seat for vehicle in coordination with an operation of the connection structure of the control cable in one embodiment of the present invention will now be described.

Referring again to FIGS. 1 and 2, as operation lever 102 is operated, inner cable 2a of one control cable 2 is pulled. As end portion 2b of inner cable 2a of one control cable 2 is engaged with end surface 5a of joint member 5, joint member 5 moves in internal space IS in joint case 4 toward one control cable 2.

As attachment member 6 locked to joint member 5 also moves, end portion 3b of each of first control cable 31 and second control cable 32 also moves. Therefore, each of first control cable 31 and second control cable 32 is pulled. Thus, reclining reset lever 104 is operated by first control cable 31 and second control cable 32, and hence a reclined state of seat back 103 is reset.

A step of removing the inner cable of the other control cable in the connection structure of the control cable in one embodiment of the present invention will now be described.

Figure 7:
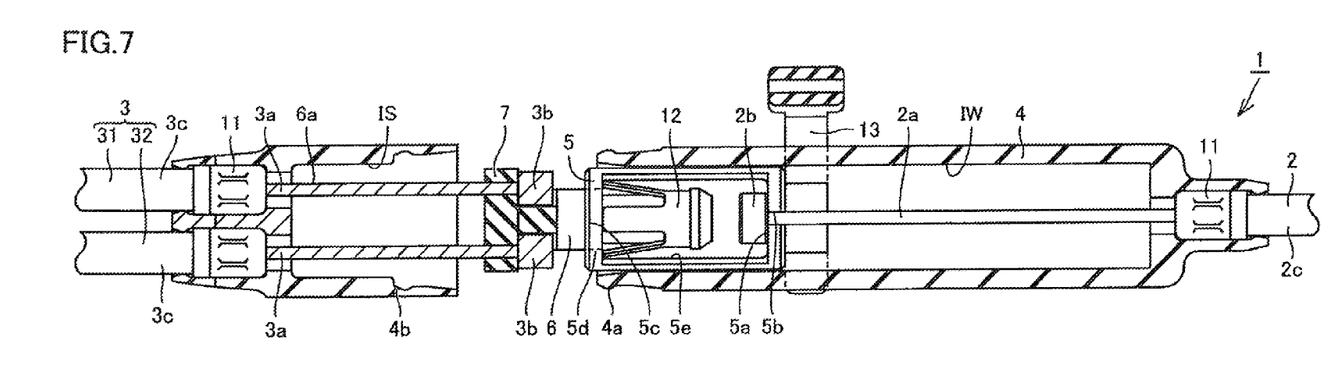
FIG. 7 is a schematic partial cross-sectional view showing a step of removing the inner cable of the other control cable in the connection structure of the control cable in one embodiment of the present invention.

Referring to FIG. 7, initially, a projection 4a and a recess 4b of joint case 4 are disengaged from each other. In succession, as inner cable 2a of one control cable 2 is pulled, joint member 5 moves toward one control cable 2. Here, as joint member 5 is locked to the protrusion of locking member 13, movement of joint member 5 in internal space IS in joint case 4 is restricted. As inner cable 2a is pulled while movement of this joint member 5 is restricted, a portion of joint case 4 on the one control cable 2 side, in which locking member 13 is inserted, moves toward one control cable 2 together with joint member 5. Thus, joint case 4 is separated to pieces on respective sides of one control cable 2 and the other control cable 3. Here, inner cable 3a of each of first control cable 31 and second control cable 32 held in fitting portion 7 of attachment member 6 connected to joint member 5 is pulled out of outer casing 3c.

Fitting portion 7 of attachment member 6 projects from the portion of joint case 4 on the one control cable 2 side toward the other control cable 3 while joint member 5 is locked to the protrusion of locking member 13. Therefore, when joint case 4 is separated, fitting portion 7 is exposed from internal space IS. While joint case 4 is separated to expose fitting portion 7 from internal space IS, end portion 3b of inner cable 3a of each of first control cable 31 and second control cable 32 is also exposed from internal space IS.

Namely, as fitting portion 7 and end portion 3b of inner cable 3a are pulled out from the portion of joint case 4 on the other control cable 3 side toward one control cable 2 at the time of separation of joint case 4, fitting portion 7 and end portion 3b of inner cable 3a are exposed. While fitting portion 7 is thus exposed, inner cable 3a of the other control cable 3 is removed from fitting portion 7.

A manner of removal of inner cable 3a of the other control cable 3 from fitting portion 7 will be described further in detail. Referring again to FIG. 3, detachment prevention member 63 and inner cable 3a are disengaged from each other and inner cable 3a is removed from inner cable accommodation portion 62. Thereafter, end portion 3b is removed from opening 6c in end portion accommodation portion 61. It is noted that at least any of first control cable 31 and second control cable 32 should only be removed.

Thereafter, as necessary, the other control cable 3 can be replaced. Inner cable 3a of the other control cable 3 is attached to fitting portion 7 in the order reverse to the order in the method of removal from fitting portion 7 described above.

A function and effect of the connection structure of the control cable in one embodiment of the present invention will now be described.

In connection structure 1 of the control cable in one embodiment of the present invention, attachment member 6 has fitting portion 7 allowing fitting of inner cable 3a of each of first control cable 31 and second control cable 32 into outer circumferential surface 6a of attachment member 6. Then, fitting portion 7 can be exposed from internal space IS when joint case 4 is separated. Therefore, inner cable 3a of each of first control cable 31 and second control cable 32 can be held in fitting portion 7 or removed from fitting portion 7 while fitting portion 7 is exposed from internal space IS. Therefore, inner cable 3a of each of first control cable 31 and second control cable 32 can readily be removed.

In addition, since first control cable 31 and second control cable 32 can be removed from fitting portion 7 in outer circumferential surface 6a of attachment member 6, each inner cable 3a can readily be removed even in the case where there are a plurality of the other control cables 3.

Moreover, since respective inner cables 3a of first control cable 31 and second control cable 32 can be fitted to fitting portion 7, when any one inner cable 3a is broken, broken inner cable 3a alone can readily be removed. Thus, broken inner cable 3a can readily be replaced.

In connection structure 1 of the control cable in one embodiment of the present invention, inner cable 3a of each of first control cable 31 and second control cable 32 is locked to fitting portion 7 in direction YD crossing direction of movement XD of attachment member 6 in joint case 4. Therefore, even when attachment member 6 moves in joint case 4, such a state that inner cable 3a of each of first control cable 31 and second control cable 32 is fitted to attachment member 6 can be held.

In connection structure 1 of the control cable in one embodiment of the present invention, since end portion 3b of inner cable 3a of the other control cable 3 is received in end portion accommodation portion 61, inner cable 3a of the other control cable 3 can readily be removed through opening 6c in side surface 6b of attachment member 6. Furthermore, detachment prevention member 63 can also prevent detachment of inner cable 3a of the other control cable 3 from attachment member 6 after inner cable 3a of the other control cable 3 is placed in attachment member 6.

In connection structure 1 of the control cable in one embodiment of the present invention, locking surface 63a can restrict movement of inner cable 3a of the other control cable 3 in a direction of opening of end portion accommodation portion 61. Thus, detachment of inner cable 3a of the other control cable 3 in the direction of opening can be prevented.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A connection structure of a control cable, comprising,
    one control cable connected to a drive side,
    another control cable connected to a driven side,
    a joint case having one end and another end which is opposite from the one end,
    a joint member, and
    an attachment member, wherein;
    said joint case has an internal space in which an end portion of an inner cable of said one control cable and an end portion of an inner cable of said another control cable are arranged and are separated on respective sides of said one control cable and said another control cable along the axial direction of said one and another control cables;
    said joint member is connected to the end portion of said inner cable of said one control cable and is movable along an inner wall of said internal space;
    said attachment member, provided on the driven side of the joint member, is connected to the end portion of said inner cable of said another control cable, is connected to said joint member in said internal space, and is movable along the inner wall of said internal space in a connected state;
    said another control cable includes first and second control cables that are connected to the driven side through said another end of the joint case;
    said attachment member has a fitting portion allowing fitting of said inner cable of each of said first and second control cables into an outer circumferential surface of said attachment member; and
    said fitting portion is exposed from said internal space when said joint case is separated.

2. The connection structure of a control cable according to claim 1, wherein
    a direction of fitting of the inner cable of each of said first and second control cables to said attachment member is a direction crossing a direction of movement of said attachment member in said joint case.

3. The connection structure of a control cable according to claim 1, wherein
    said attachment member includes
        an end portion accommodation portion for receiving the end portion of said inner cable of each of said first and second control cables, which is provided to open to a side surface on a side of said one control cable relative to an end surface on a side of said another control cable,
        an inner cable accommodation portion for accommodating said inner cable of each of said first and second control cables provided on the side of said another control cable relative to said end portion accommodation portion, and
        a detachment prevention member for preventing detachment of said inner cable of each of said first and second control cables from said attachment member after said inner cable of said another control cable is placed in said attachment member.

4. The connection structure of a control cable according to claim 3, wherein
    said detachment prevention member includes a locking surface provided in said inner cable accommodation portion, for restricting movement of said inner cable of each of said first and second control cables in a direction from a center of the end portion accommodation portion toward opening of said end portion accommodation portion.

5. The connection structure of a control cable according to claim 3, wherein said joint case is in a cylindrical shape and said attachment member is provided inside of said joint case wherein said detachment prevention member includes a protrusion which protrudes from the radially external portion of the inner cable accommodation portion where said inner cable of each of first and second control cables is accommodated radially inward side of the protrusion.

6. The connection structure of a control cable according to claim 5, wherein said protrusion protrudes in such a manner that, in a cross sectional view, a line connecting between the radial center of the joint case and the axial center of the inner cable of one of said first and second control cables intersect with said protrusion.

* * * * *